(12) United States Patent
Farmer et al.

(10) Patent No.: US 11,694,033 B2
(45) Date of Patent: Jul. 4, 2023

(54) TRANSPARENT ITERATIVE MULTI-CONCEPT SEMANTIC SEARCH

(71) Applicant: RELX Inc., Miamisburg, OH (US)

(72) Inventors: Kathryn Farmer, Cary, NC (US); Ankur Oberai, Morrisville, NC (US); Dhruv Sakalley, Morrisville, NC (US); Michael Etgen, Raleigh, NC (US); Sachin Kumar, Delhi (IN); Sanket Shukl, Raleigh, NC (US)

(73) Assignee: RELX INC., Miamisburg, OH (US)

( * ) Notice: Subject to any disclaimer, the term of this patent is extended or adjusted under 35 U.S.C. 154(b) by 207 days.

(21) Appl. No.: 17/028,382

(22) Filed: Sep. 22, 2020

(65) Prior Publication Data

US 2021/0089719 A1    Mar. 25, 2021

Related U.S. Application Data

(60) Provisional application No. 62/904,901, filed on Sep. 24, 2019.

(51) Int. Cl.
  *G06F 40/30* (2020.01)
(52) U.S. Cl.
  CPC .................................. *G06F 40/30* (2020.01)
(58) Field of Classification Search
  None
  See application file for complete search history.

(56) References Cited

U.S. PATENT DOCUMENTS

| | | | |
|---|---|---|---|
| 8,700,404 B1* | 4/2014 | Chotimongkol | G10L 15/18 704/255 |
| 9,008,435 B2 | 4/2015 | Gokturk et al. | |
| 10,031,950 B2 | 7/2018 | Ullman et al. | |
| 10,152,514 B2 | 12/2018 | Pedersen et al. | |
| 10,445,327 B2 | 10/2019 | Miller et al. | |
| 2005/0154708 A1* | 7/2005 | Sun | G06F 16/27 |
| 2006/0167696 A1 | 7/2006 | Chaar et al. | |
| 2008/0294624 A1 | 11/2008 | Kanigsberg et al. | |
| 2009/0187554 A1 | 7/2009 | Dugan et al. | |
| 2016/0232160 A1 | 8/2016 | Buhrmann et al. | |

(Continued)

OTHER PUBLICATIONS

Notification of Transmittal of the International Search Report and the Written Opinion issued in corresponding International Application No. PCT/US2020/051983 dated Dec. 30, 2020.

*Primary Examiner* — Quynh H Nguyen
(74) *Attorney, Agent, or Firm* — Dinsmore & Shohl (57) ABSTRACT

A method comprises receiving a natural language search query, identifying a first set of semantic concepts in the query, creating a vector representation of the first set of semantic concepts, identifying a second set of semantic concepts having a vector representation within a predetermined threshold of similarity to the first set of semantic concepts, performing a search of documents based on the first set of semantic concepts, presenting a result set of documents and the first, second, and third sets of semantic concepts to a user, receiving input from the user, performing a second search of the documents based on the input from the user to obtain a second result set of documents, identifying a fourth set of semantic concepts based on the second result set of documents, and presenting the second result set of documents and the fourth set of semantic concepts to the user.

20 Claims, 7 Drawing Sheets

(56) References Cited

U.S. PATENT DOCUMENTS

| | | | |
|---|---|---|---|
| 2018/0083901 A1 | 3/2018 | McGregor, Jr. et al. | |
| 2018/0144047 A1 | 5/2018 | Beller et al. | |
| 2018/0375896 A1* | 12/2018 | Wang | G06F 16/9535 |
| 2019/0272269 A1 | 9/2019 | Suleman et al. | |
| 2019/0272277 A1* | 9/2019 | Chaubal | G06F 16/345 |
| 2019/0318009 A1 | 10/2019 | Miller et al. | |

\* cited by examiner

| LEXIS SPROUT | | Client -none- | History | More |

Sprout

[ENTER FACTS, PASSAGES OR ANYTHING YOU LIKE] 510

[SEARCH OPTIONS & FILTERS ⌄]    🔍 520

Explore

| Content Type | Federal | State | Practice Area or Industry | International |
|---|---|---|---|---|
| Cases | | Secondary Materials | News | Directories |
| Statutes and Legislation | | Forms | Legal News | Intellectual Property |
| Administrative Codes and Regulations | | Briefs, Pleadings and Motions | Dockets | Practical Guidance |
| Administrative and Agency Materials | | Jury Verdicts and Settlements | Scientific | Public Records |
| Jury Instructions | | Expert Witness Analysis | Company and Financial | |

TRANSPARENT ITERATIVE MULTI-CONCEPT SEMANTIC SEARCH

CROSS-REFERENCE TO RELATED APPLICATION

This application claims priority to U.S. Provisional Application No. 62/904,901, filed Sep. 24, 2019, the entire contents of which is hereby incorporated by reference.

FIELD

The present disclosure generally relates to semantic searching, and more particularly to transparent iterative multi-concept semantic search.

BACKGROUND

A variety of different types of search queries may be used to search document databases (e.g., databases containing legal documents, patent documents, news articles, financial documents, etc.) in order to identify documents that are related to the search query. Search engines traditionally require that search queries be entered using keywords and connectors (e.g., Boolean connectors). While this type of search query may allow for precisely defined searches, the necessity to enter keywords and connectors may be difficult or not desirable for certain users.

Alternatively, many search engines now allow users to enter natural language search queries. This type of search query may be easier for users to construct since there is no need to understand how to use keywords or Boolean connectors. However, there is a risk that users may construct ineffective natural language search queries that yield unsatisfactory search results that do not satisfy the user's search objective. This may occur because the natural language search query entered by a user may be unable to be translated by the search engine into appropriate searchable concepts that match the user's intended search parameters. Furthermore, a user may be unaware of the relevance of a set of documents identified in response to the natural language search query until the user spends a significant amount of time and effort reviewing the documents. Accordingly, there is a need for an improved method of performing natural language searches.

SUMMARY

In one embodiment, a method for performing a search of a corpus of documents includes receiving, at a computing device, a natural language search query, identifying one or more first semantic concepts in the natural language search query, creating a vector representation of the identified one or more first semantic concepts, identifying one or more second semantic concepts having a vector representation within a predetermined threshold of similarity to the vector representation of one or more of the first semantic concepts, performing a search of the corpus of documents based on the first semantic concepts and the second semantic concepts to obtain a result set of documents, identifying one or more third semantic concepts based on the result set of documents, presenting the result set of documents to a user, and presenting the first semantic concepts, the second semantic concepts, and the third semantic concepts to the user.

In another embodiment, a system for performing a search of a corpus of documents includes a processing device and a non-transitory, processor-readable, storage medium. The storage medium may include one or more programming instructions stored thereon that, when executed, cause the processing device to receive a natural language search query, identify one or more first semantic concepts in the natural language search query, create a vector representation of the identified one or more first semantic concepts, identify one or more second semantic concepts having a vector representation within a predetermined threshold of similarity to the vector representation of one or more of the first semantic concepts, perform a search of the corpus of documents based on the first semantic concepts and the second semantic concepts to obtain a result set of documents, identify one or more third semantic concepts based on the result set of documents, present the result set of documents to a user, and present the first semantic concepts, the second semantic concepts, and the third concepts to the user.

In another embodiment, a non-transitory, computer-readable storage medium that is operable to perform a search of a corpus of documents includes one or more programming instructions stored thereon. The one or more programming instructions may cause the processing device to receive a natural language search query, identify one or more first semantic concepts in the natural language search query, create a vector representation of the identified one or more first semantic concepts, identify one or more second semantic concepts having a vector representation within a predetermined threshold of similarity to the vector representation of one or more of the first semantic concepts, perform a search of the corpus of documents based on the first semantic concepts and the second semantic concepts to obtain a result set of documents, identify one or more third semantic concepts based on the result set of documents, present the result set of documents to a user, and present the first semantic concepts, the second semantic concepts, and the third semantic concepts to the user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for extracting semantic concepts from a natural language search query, performing a search based on the extracted semantic concepts, and displaying the results of the search in a user interface that may be manipulated by a user to refine the search. The user interface displays the search results along with the semantic concepts that were used to perform the search. The user interface also displays a slider bar adjacent to each extracted concept. A user may manipulate the slider bars to adjust the weights that should be given to each concept. An updated search may then be performed using the weighted values of the concepts identified by the user.

By displaying the concepts that were used to perform the search, the user may quickly and easily see how the natural language search query was interpreted. Furthermore, allowing the user to adjust the weights given to each extracted concept allows the user to refine the search without having to re-enter a new search query.

Although the embodiments are described herein in the context of a document database including legal documents (e.g., cases, statutes, etc.), patent documents, news documents, financial documents, and the like, it should be understood that embodiments are not limited thereto.

Figure 1:
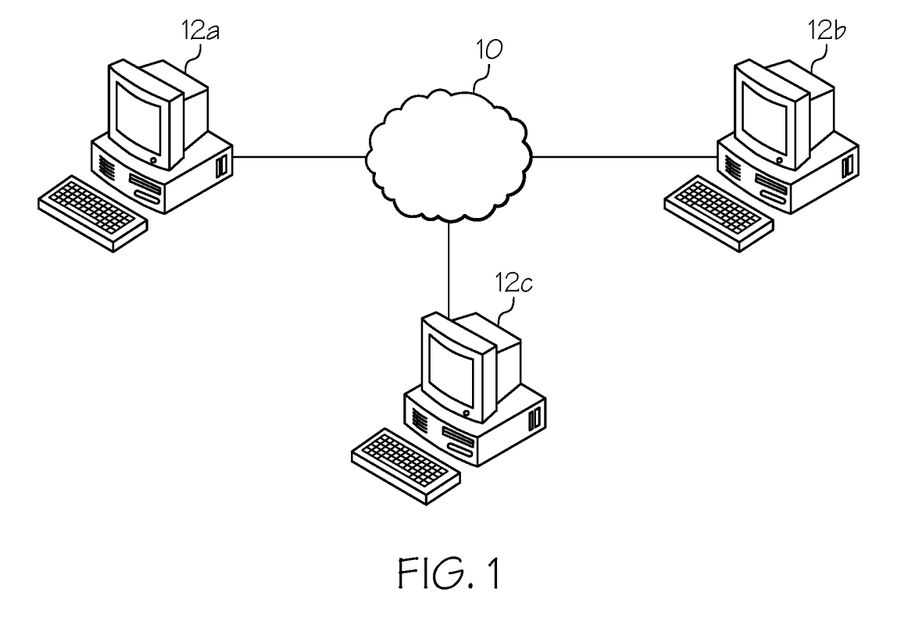
FIG. 1 schematically depicts an illustrative computing network for a system for performing a natural language search of a document database according to one or more embodiments shown and described herein.

Referring now to the drawings, FIG. 1 depicts an illustrative computing network, illustrating components of a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate natural language based searching of a document database or other corpus of documents, display and receive input from a graphical user interface used to perform such natural language based searching, and display a result set of documents and information pertaining to the result set of documents (e.g., a list of concepts extracted from a natural language search query). The user computing device 12a may also facilitate a user adjusting the weights of concepts extracted from a natural language search query (e.g., by adjusting a slider associated with each concept). The user computing device 12a may also be utilized to perform other user functions.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the document database.

The server computing device 12b may receive a natural language search query from the user computing device 12a and may perform a search of a document database to identify a result set of documents related to the query using the techniques disclosed herein. After performing the search and identifying the result set of documents, the server computing device 12b may transmit the result set of documents and related information to the user computing device 12a such that the user computing device 12a may display the result set of documents and information pertaining to the result set of documents. The components and functionality of the server computing device 12b will be set forth in detail below.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, the server computing device 12b, and the administrator computing device 12c may represent a plurality of computers, servers, databases, etc.

Figure 2:
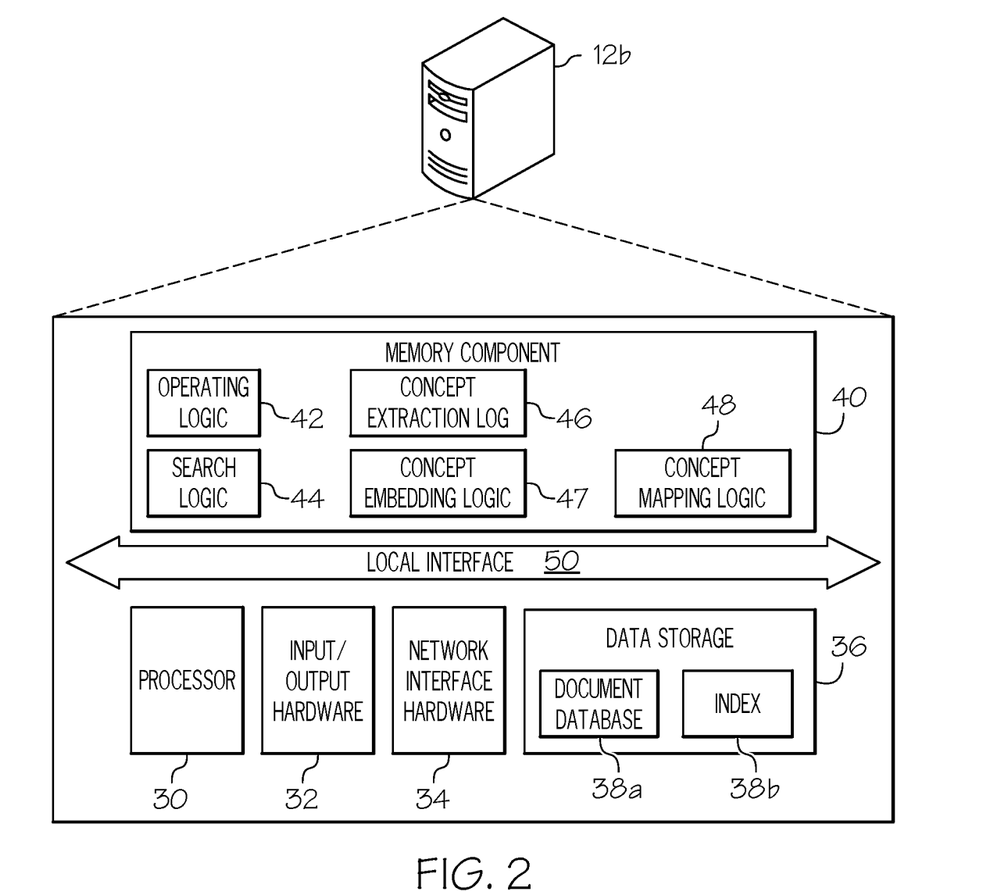
FIG. 2 schematically depicts the server computing device from FIG. 1, further illustrating hardware and software that may be used in performing a natural language search of a document database according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store a document database 38a and an index 38b), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, search logic 44, concept extraction logic 46, a concept embedding logic 47, and concept mapping logic 48 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the document database 38a and the index 38b. In at least one embodiment, the document database 38a includes a corpus of documents that have been organized and indexed for searching. The index 38b may comprise a list of known concepts and one or more documents in the document database 38a that are associated with each known concept. The document database 38a and the index 38b may be stored in one or more data storage devices. In another embodiment, the server computing device 12b may be coupled to a remote server or data storage device that comprises one or more of the documents in the document database 38a. Other data may be stored in the data storage component 36 to provide support for functionalities described herein.

Included in the memory component 40 are the operating logic 42, the search logic 44, the concept extraction logic 46, the concept embedding logic 47, and the concept mapping logic 48. The operating logic 42 may include an operating system and/or other software for managing components of the server computing device 12b. Similarly, the search logic 44 may reside in the memory component 40 and may be configured to search the document database 38a (e.g., by searching the index 38b) based on natural language search queries received from the user computing device 12a. The concept extraction logic 46 may be operable to extract concepts from a natural language search query. The concept embedding logic 47 may be used to create an embedding or vector representation of concepts extracted by the concept extraction logic 46. The concept mapping logic 48 may be operable to map extracted concepts against known concepts in the index 38b. The functionalities of the search logic 44, the concept extraction logic 46, the concept embedding logic 47, and the concept mapping logic 48 will be described in further detail below.

It should be understood that the components illustrated in FIG. 2 are merely illustrative and are not intended to limit the scope of this disclosure. More specifically, while the components in FIG. 2 are illustrated as residing within the server computing device 12b, this is a non-limiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

As mentioned above, the various components described with respect to FIG. 2 may be used to carry out one or more processes and/or provide functionality for performing a natural language search of a document database. An illustrative example of the various processes is described with respect to FIG. 3. Although the steps associated with the blocks of FIG. 3 will be described as being separate tasks, in other embodiments, the blocks may be combined or omitted. Further, while the steps associated with the blocks of FIG. 3 will be described as being performed in a particular order, in other embodiments, the steps may be performed in a different order.

Figure 3:
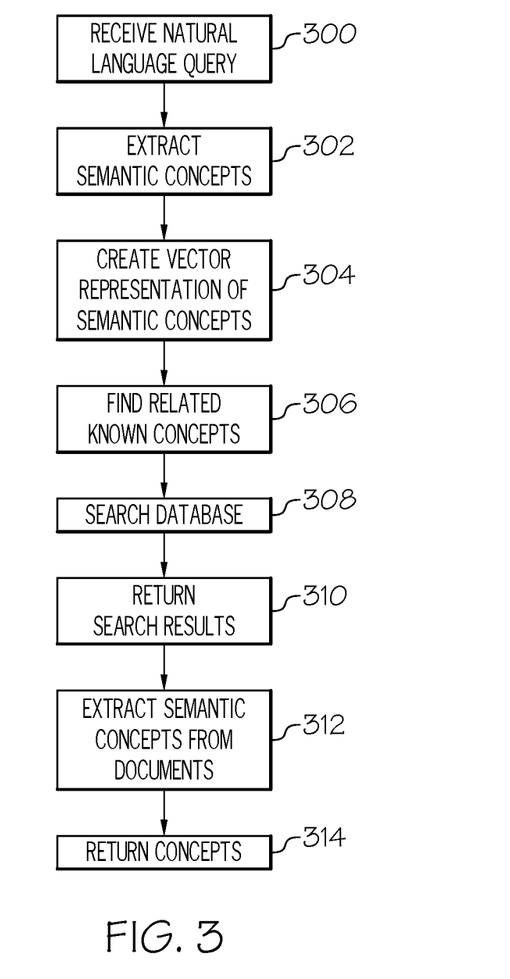
FIG. 3 depicts a flow diagram of an illustrative method of performing a natural language search of a document database according to one or more embodiments shown and described herein.
Figure 5:
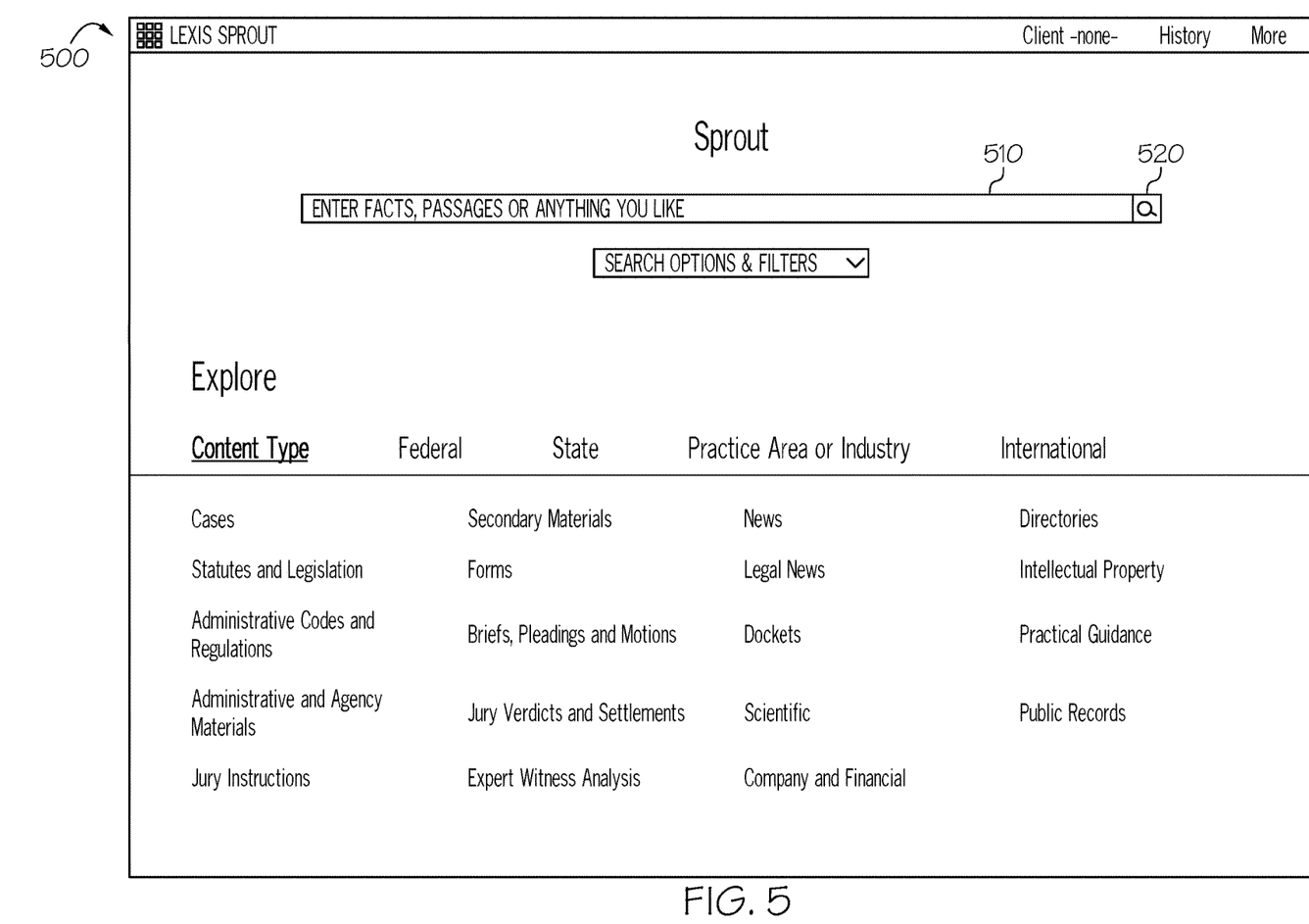
FIG. 5 depicts an illustrative graphical user interface for inputting a natural language search query according to one or more embodiments shown and described herein.

At step 300, a natural language search query is received by the server computing device 12b. In the illustrated example, the natural language query is first input by a user into the user computing device 12a and is then transmitted to the server computing device 12b. In other examples, the natural language search query may be entered directly into the server computing device 12b. In some examples, a graphical user interface is displayed on a display device of the user computing device 12a to facilitate entry of a natural language search query. FIG. 5 shows one example of such a graphical user interface. However, it should be understood that embodiments are not limited to the configurations of the graphical user interfaces illustrated throughout the figures, and that other graphical user interface configurations are possible. In one embodiment, the computer network 10 is the Internet and the graphical user interfaces described herein are presented to the user on a display device of the user computing device 12a via a web browser Referring to FIG. 5, the graphical user interface 500 includes a natural language query input element 510 configured to request a submission of a natural language search query from a user. In some examples, text input may be provided in the natural language query input element 510, such as when a user may select the natural language query input element 510 as a field of entry and type text into the natural language query input element 510. In some examples, a user may have been presented a separate search screen (e.g., a user interface with a search box and a "search" button or a search box that immediately causes a search to run when text is inputted) used by the user to enter the search query, such as by typing the natural language search query into the search box or providing the natural language search query by speaking the search query into a microphone.

The graphical user interface 500 may also include a search initiation icon 520. The search initiation icon 520 may be used to start the search once the query has been entered into the natural language query input element 510. In some examples, when a user presses or clicks on the search initiation icon 520, the search query entered into the natural language query input element 510 is transmitted to the server computing device 12b It should be understood that the user may interact with the user interfaces provided herein via voice to provide the user with a natural interaction experience, which may be useful in some embodiments in which the user computing device 12a is a tablet or smartphone. In embodiments in which the search query is input via voice, the voice input may be translated, parsed, or processed in some manner by a speech recognition algorithm to produce the natural language search query. In some embodiments, the natural language query input element 510 may include one or more prompts or screens that may guide a user through various pieces of information used to construct the natural language search query (e.g., prompting a user to enter a practice area, a date range, a jurisdiction, or the like).

As explained above, in the example of FIG. 5, a user may input a natural language search query into the natural language query input element 510. A natural language search query may comprise a search query using language that matches the language the humans use to speak to each other. A natural language search query need not take any specific form. In particular, a natural language search query does not require the use of keywords and connectors (e.g., Boolean connectors). A natural language search query may be simpler and more natural for a user to enter than a traditional keyword search.

The graphical user interface 500 may be displayed in response to an input received from the server computing device 12b, including one or more elements to be displayed in the graphical user interface. The graphical user interfaces described herein may facilitate the generation of natural language search queries and the iterative refinement and manipulation of natural language search queries such that a user may identify desired content and have confidence that the identified content is relevant. As such, the functionality of the various computing devices described herein is improved because they more accurately (or are more likely to) provide search results that relate to a particular user's needs, relative to computing devices that do not provide an iterative refinement and manipulation of natural language search queries. The graphical user interfaces described herein may be particularly useful when the user computing device 12a is a tablet device or smartphone. Furthermore, it should be understood that any of the graphical user interfaces and elements described herein may be embedded or integrated in various product features and at various points of a search process.

Referring back to FIG. 3, at step 302, after the server computing device 12b receives the query from the user computing device 12a, the concept extraction logic 46 identifies and extracts one or more semantic concepts from the natural language search query using the techniques described herein. In some examples, the concept extraction may be performed by the user computing device 12a rather than the concept extraction logic 46 of the server computing device 12b. Extracting semantic concepts from the natural language search query is useful because unlike a traditional keyword search, a natural language search is likely to contain extraneous words that do not aid in performing the search. In addition, the substantive words in a natural language search query may not precisely match the concepts in the index 38b associated with the document database 38a. Accordingly, extracting semantic concepts from the natural language search query may greatly increase the performance of the search.

In embodiments, the concept extraction logic 46 analyzes the natural language search query and identifies one or more semantic concepts in the natural language search query. A variety of techniques may be used to identify semantic concepts in a query. In one example, the concept extraction logic 46 may use a natural language processing kit such as, without limitation, spaCy or Natural Language Toolkit (NLTK) to identify keyword terms in the query as semantic concepts.

Natural language processing kits such as spaCy or NLTK are software programs that may use a variety of techniques to identify semantic concepts in a body of text such as a natural language search query. For example, a natural language processing kit may identify a syntactic structure of a query and may identify parts of speech tags such as noun and verb terms and n-grams as keyword terms. As such, a natural language processing kit may allow the concept extraction logic 46 to quickly and easily extract one or more semantic concepts from the received natural language search query. Furthermore, a natural language processing kit may allow syntactic chunking of text into meaningful tokens.

In some embodiments, the concept extraction logic 46 may use a natural language processing kit to identify one or more semantic concepts in the natural language search query and assign a relevancy score to each identified semantic concept. The relevancy score may be an indication of how strongly the identified semantic concept relates to the query. In these examples, the concept extraction logic 46 may ignore semantic concepts identified by the natural language processing kit that have a relevancy score below a predetermined threshold and only select the identified semantic concepts that have a relevancy score above the predetermined threshold.

In another example, the concept extraction logic 46 may use term frequency-inverse document frequency (TF-IDF) analysis to identify semantic concepts in the natural language search query. In these examples, the concept extraction logic 46 obtains a TF-IDF score for each word in the received natural language search query. In some examples, the concept extraction logic 46 also obtains a TF-IDF score for each multi-word phrase in the received natural language search query (e.g., every combination of two adjacent words in the query, every combination of three adjacent words in the query, etc.). The concept extraction logic 46 may select each word or phrase in the natural language search query that has a TF-IDF score above a predetermined threshold as a semantic concept.

A TF-IDF score is a combination of term frequency and inverse document frequency for a particular term and a particular corpus of documents. The term frequency measures the frequency that a term appears in a particular document (e.g., a raw count of the number of times the term appears in the document). Thus, the more often that a term appears in a document, the higher its term frequency will be. Accordingly, the concept extraction logic 46 may compute the term frequency of a word or phrase from the natural language search query as the frequency that the word or phrase appears in each document of the corpus of documents stored in the document database 38a. Thus, the word or phrase will have a different term frequency score for each document in the corpus.

The inverse document frequency measures how rarely a word or phrase appears throughout the entire corpus of documents. It is generally computed as a logarithmically scaled inverse fraction of the documents in a corpus that contain the word or phrase. Thus, if a word or phrase rarely appears in the corpus, it will have a high inverse document frequency, whereas if the word or phrase appears often in the corpus, it will have a low inverse document frequency. Inverse document frequency may be used as a measure of the amount of information that a word contains. For example, the word "the" will typically appear often in many documents. Thus, for any particular document, the word "the" is likely to have a high term frequency. However, because the word "the" appears frequently across the entire corpus of documents, the word "the" will have a low inverse document frequency. Thus, combining term frequency and inverse document frequency may provide an indication of how relevant a particular document is to a word or phrase. As such, a TF-IDF score is typically computed by multiplying term frequency and inverse document frequency.

The concept extraction logic 46 may determine a TF-IDF score for each word or phrase from the natural language search query with respect to each document in the document database 38a. The concept extraction logic 46 may then select as a semantic concept, each word or phrase having a TF-IDF score with respect to one or more documents in the document database 38a above a predetermined threshold.

In some examples, the concept extraction logic 46 may use both a natural language processing toolkit and TF-IDF analysis to extract semantic concepts from the natural language search query. In one example, the concept extraction logic 46 uses a natural language processing kit, as described above, to identify a first set of semantic concepts and performs TF-IDF analysis, as described above, to identify a second set of semantic concepts. The concept extraction logic 46 then selects each concept from the first set of semantic concepts and each concept from the second set of semantic concepts as semantic concepts contained in the natural language search query. In another example, the concept extraction logic 46 weights the semantic concepts identified using a natural language processing kit by a first weight value and weights the semantic concepts identified by performing TF-IDF analysis by a second weight value (e.g., by multiplying the first weight by the relevancy scores from the natural language processing kit and multiplying the second weight by the TF-IDF scores) and selects as semantic concepts contained in the natural language search query, the more highly weighted concepts (e.g., the concepts having a weighted relevancy score or weighted TF-IDF score above a threshold).

In another example, the concept extraction logic 46 first uses a natural language processing kit to identify keyword terms (e.g., semantic concepts) from the natural language search query. The concept extraction logic 46 then determines a TF-IDF score for each keyword term identified by the natural language processing kit. The concept extraction logic 46 then selects each keyword term having a TF-IDF score above a threshold as a semantic concept contained within the natural language search query. In some examples, the concept extraction logic 46 identifies semantic concepts from the natural language search query using one or more techniques described in U.S. Patent Publ. No. 2017/0060991, which is incorporated herein by reference.

Still referring to FIG. 3, at step 304, after the concept extraction logic 46 identifies and extracts one or more semantic concepts from the natural language search query, the concept embedding logic 47 creates a vector representation of each of the semantic concepts identified by the concept extraction logic 46 using techniques described herein. Word embedding is a technique of mapping a word or phrase into a vector of real numbers. Once a word or phrase has been translated into a vector representation, it may be mathematically compared to other words or phrases using their vector representations. In particular, a distance between the vector representations of two words or phrases (e.g., using cosine similarity) may indicate a semantic similarity between the words or phrases.

Word embedding typically involves training a neural network on a large corpus of text to create a multi-dimensional vector space with each word in the corpus having a vector representation. Words that share similar contexts are located close to each other in the vector space. Once the neural network is trained, any word or phrase may be input into word embedding model to get its vector representation. In the illustrated example, the concept embedding logic 47 uses Word2vec embedding to create a vector representation of the semantic concepts identified by the concept extraction logic 46. In other examples, other word embeddings may be used. In some examples, sentence embedding, such as Bidirectional Encoder Representations from Transformers (BERT) may be used rather than word embedding.

The concept embedding logic 47 may also create a vector representation of each word or phrase in the index 38b. The vector representation of each word or phrase in the index 38b may be stored in the data storage component 36. This may allow vector representations of extracted concepts to be quickly compared to vector representations of the concepts in the index 38b.

At step 306, the concept mapping logic 48 maps the concepts identified by the concept extraction logic 46 to closely related known concepts in the index 38b. Specifically, for each concept extracted by the concept extraction logic 46, the concept mapping logic 48 identifies known concepts in the index 38b that have a vector representation within a threshold of similarity to the vector representation of the extracted concept. In the illustrated example, the concept mapping logic 48 determines a cosine similarity between the vector representations of the concepts identified by the concept extraction logic 46 and the concepts in the index 38b. The concept mapping logic 48 then selects each concept identified by the concept extraction logic 46 that has a cosine similarity to a known concept in the index 38b that is less than a predetermined threshold. In other examples, other methods of determining a similarity between the vector representations of semantic concepts may be used.

By performing the above steps, the concept mapping logic 48 is able to map concepts identified by the concept extraction logic 46, which may not be included in the index 38b, to similar concepts that are included in the index 38b. Thus, the server computing device 12b is able to search the document database 38a based on the natural language search query input by a user even if the query contains words, phrases, and semantic concepts that are not known to the index 38b.

At step 308, the search logic 44 searches the document database 38a based on the concepts from the concept mapping logic 48. Because every concept identified by the concept mapping logic 48 is a concept contained in the index 38b, the search logic 44 may search the document database 38a by simply searching the index 38b for each concept identified by the concept mapping logic 48. The index 38b contains an association between each such concept and one or more related documents in the document database 38a. Thus, the search logic 44 may create a result set of documents corresponding to each document from the document database 38a associated with the one or more concepts from the concept mapping logic 48.

In some examples, the search logic 44 uses Elasticsearch to perform the search of the document database 38a. Elasticsearch is a search engine built on Lucene library, which provides a distributed, multitenant-capable full-text search engine with an HTTP web interface. As a non-limiting example, Elasticsearch may be hosted on the Amazon ElasticSearch Service. In some examples, the search logic 44 searches the document database 38a based on the initial search query rather than the concepts from the concept mapping logic 48. In some examples, the search logic 44 searches the document database 38a using the Okapi BM25 ranking function.

At step 310, the server computing device 12b returns the result set of documents to the user computing device 12a. In some examples, metadata associated with the result set of documents, such as publication date, may also be returned, which may be used to rank the documents.

At step 312, the concept extraction logic 46 extracts one or more semantic concepts from the result set of documents. The concept extraction logic 46 may use the techniques described above with respect to extracting semantic concepts from a search query to extract semantic concepts from the result set of documents.

In some examples, concept extraction from each document in the document database 38a may be performed as an off-line procedure. That is, for each document in the document database 38a, the concept extraction logic 46 may extract one or more semantic concepts from the document as an off-line procedure. The semantic concepts extracted from a document may then be stored in the document database 38a as metadata associated with the document. In these examples, at step 312, the concept extraction logic 46 may simply access the metadata associated with each document of the result set of documents to extract the semantic concepts associated with the result set of documents.

At step 314, the server computing device 12b returns the semantic concepts extracted from the natural language query extracted by the concept extraction logic 46, the related concepts identified by the concept mapping logic 48, and the concepts extracted from the result set of documents to the user computing device 12a. The user computing device 12a may then display the received result set of documents and all of the identified semantic concepts to the user.

Figure 6:
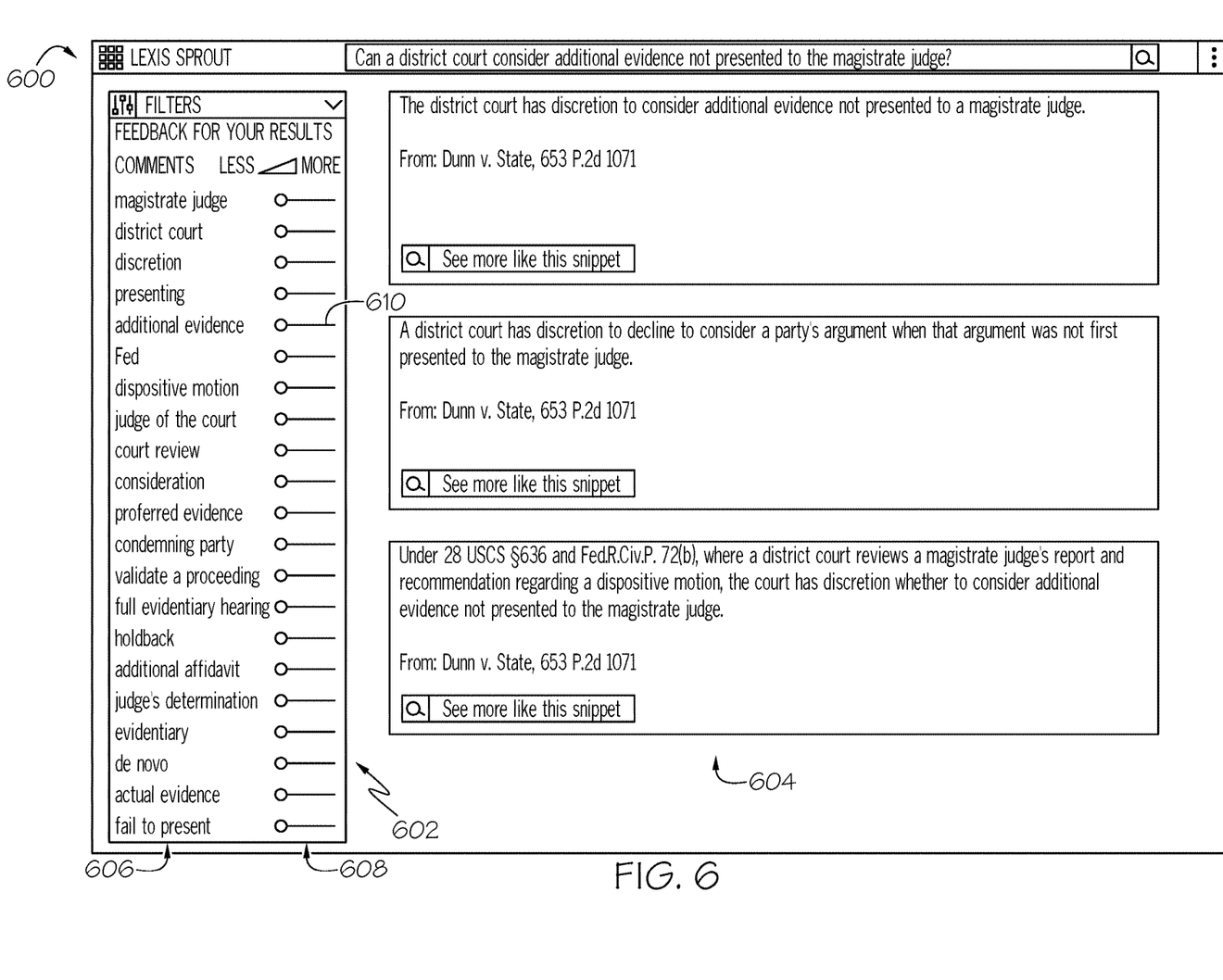
FIG. 6 depicts an illustrative graphical user interface for displaying search results according to one or more embodiments shown and described herein.

In one example, the user computing device 12a displays the received result set and the semantic concepts to the user using the example graphical user interface 600 shown in FIG. 6. Referring to FIG. 6, the graphical user interface 600 may contain two columns 602 and 604. In the example of FIG. 6, column 604 displays the result set of documents returned by the server computing device 12b along with a short summary or quoted passage from each document. In addition, column 602 displays a list of the semantic concepts 606 identified by the concept mapping logic 48 that were used to search the index 38b of the document database 38a. Column 602 also displays a plurality of slider bars 608 next to each of the semantic concepts 606. The slider bars 608 are discussed in further detail below in connection with FIG. 4. It should be understood that embodiments are not limited to the graphical user interface 600 of FIG. 6.

By displaying the semantic concepts that were obtained based on the submitted natural language search query, a user is able to see how the query was interpreted. As such, the user may realize that certain words or phrases used in the natural language search query were not interpreted as desired. Alternatively, the user may simply see that the search results returned do not match the type of results they were expecting. Thus, the user may decide to reformulate the natural language search query in a way to better express their desired search terms. Alternatively, the user may utilize the features described below in connection with FIG. 4 to manipulate and iterate the search results.

Figure 4:
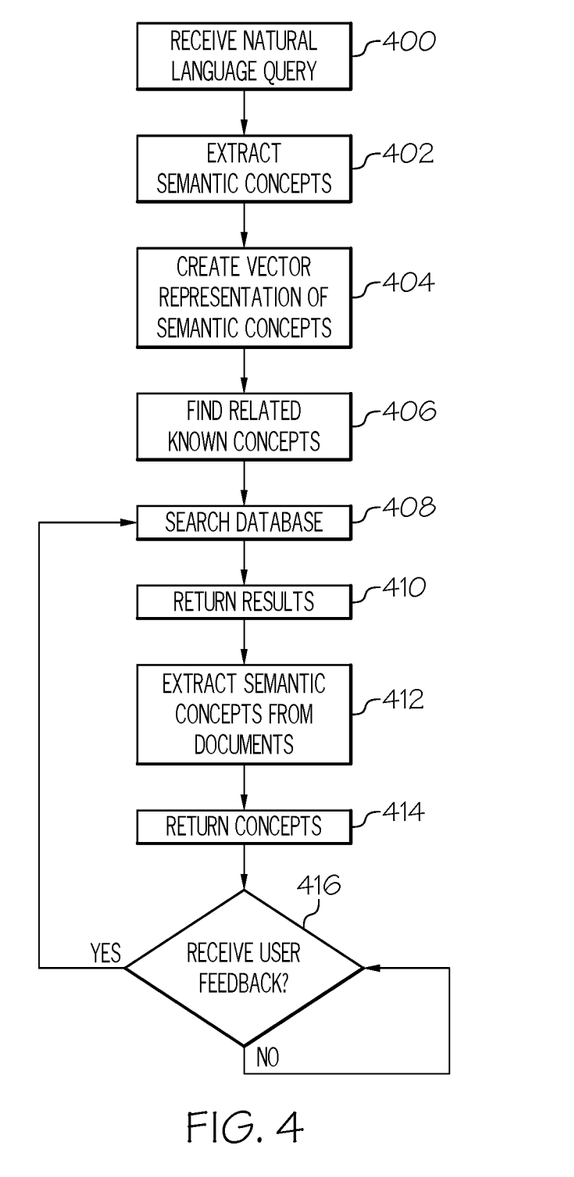
FIG. 4 depicts a flow diagram of another illustrative method of performing a natural language search of a document database according to one or more embodiments shown and described herein.

Referring now to FIG. 4, a flow diagram of another illustrative method that may be performed by the components of FIG. 2 is depicted. Although the steps associated with the blocks of FIG. 4 will be described as being separate tasks, in other embodiments, the blocks may be combined or omitted. Further, while the steps associated with the blocks of FIG. 4 will be described as being performed in a particular order, in other embodiments, the steps may be performed in a different order. Steps 400-412 of FIG. 4 are the same as steps 300-312 of FIG. 3 and are not discussed in detail.

At step 400, a natural language search query is received by the server computing device 12b. In the illustrated example, the natural language search query is input to the user computing device 12a by a user using the graphical user interface 500 of FIG. 5 and is then transferred from the user computing device 12a to the server computing device 12b. At step 402, the concept extraction logic 46 extracts one or more semantic concepts from the natural language search query. At step 404, the concept embedding logic 47 creates vector representations of the semantic concepts extracted from the natural language search query by the concept extraction logic 46. At step 406, the concept mapping logic 48 uses the vector representations of the semantic concepts identified by the concept extraction logic 46 to identify one or more related concepts found in the index 38b. At step 408, the search logic 44 searches the document database 38a using the index 38b based on the concepts identified by the concept mapping logic 48 or the natural language search query to obtain a result set of documents. At step 410, the server computing device 12b returns the result set of documents to the user computing device 12a. At step 412, the concept extraction logic 46 extracts one or more semantic concepts from the result set of documents. In some examples, the concept extraction logic 46 extracts the semantic concepts from the result set of documents based on metadata associated with the documents compiled using an offline procedure. At step 414, the server computing device 12b returns the concepts extracted from the natural language search query, the concepts identified by the concept mapping logic 48, and the concepts extracted from the result set of documents to the user computing device 12a.

As discussed above, after the user computing device 12a receives the result set and concepts from the server computing device 12b, the user computing device 12a may display the result set and the concepts to a user. In the illustrated example, the graphical user interface 600 of FIG. 6 is used to display the result set in column 604 and the concepts in column 602. In addition, column 602 displays the semantic concepts 606 adjacent to slider bars 608. The slider bars 608 may be adjusted by a user to apply weightings to the semantic concepts 606, thereby boosting certain concepts. After the various slider bars 608 are adjusted, a new search may be run based on the weighted or boosted concepts as set by the slider bar. That is, a new search may be run wherein concepts that are weighted higher count more towards a relevance score. Thus, more search results will be returned that are relevant to higher weighted concepts.

Figure 7:
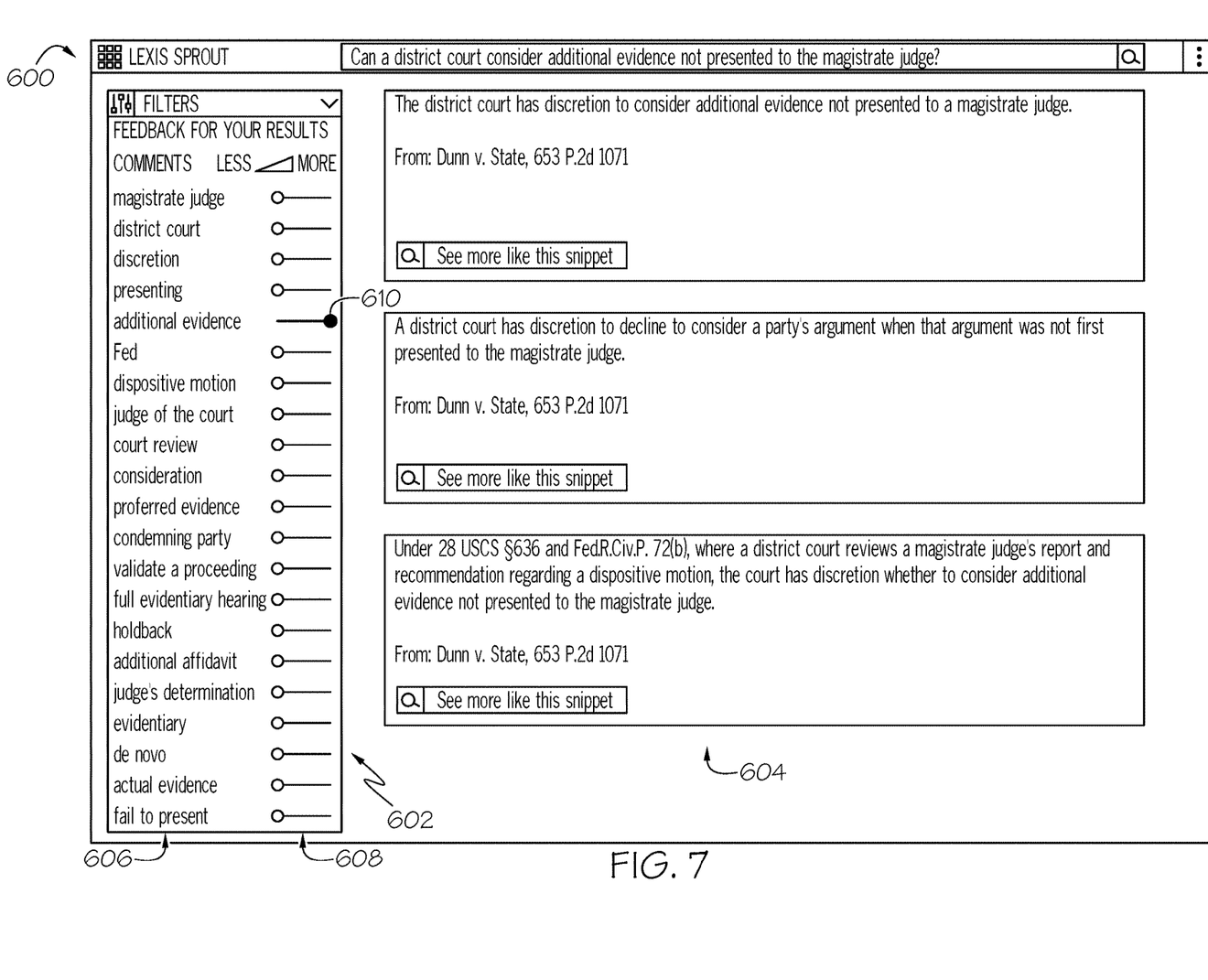
FIG. 7 depicts another example of the graphical user interface of FIG. 6.

In the example of FIG. 6, all of the slider bars 608 are set all the way to the left, meaning that each concept is equally weighted, including slider bar 610 adjacent to the concept "additional evidence." However, FIG. 7 shows another example of the graphical user interface 600 where the slider bar 610 adjacent to the concept "additional evidence" has been adjusted upward. This means that the concept "additional evidence" will be weighted more heavily than the other concepts 606 in subsequent searches. The slider bars 608 may be adjusted in any manner to apply any combination of weights to the various concepts 606.

By allowing a user to adjust the weights of the concepts 606, the user may easily perform a new search without re-entering a new search query. The new search may be performed by weighting the various concepts 606 to focus the new search more heavily on the concepts in which the user is most interested. In addition, if the user is not at all interested in one or more of the concepts 606, the graphical user interface 600 may have a feature that allows the user to remove those topics completely from subsequent searches. In some examples, the graphical user interface 600 also allows the user to add additional concepts to be included in a subsequent search.

Referring back to FIG. 4, at step 416, the user computing device 12a may receive user feedback about the result set of documents returned by the server computing device 12b. The user feedback may comprise adjustments to the weights of the semantic concepts 606 using the slider bars 608 as described above. The user feedback may also comprise the removal of one or more concepts from the list of semantic concepts 606 or an addition of one or more concepts. Once, the user has finished adjusting the weights and removing unwanted concepts, the user may press or click a button or otherwise indicate that a new search is to be performed based on the adjusted concepts and weightings. If no such user feedback is received, step 416 may be repeated until user feedback is received. If user feedback is received at step 416, the user feedback may be transmitted to the server computing device 12b and control may return to step 408.

At step 408, the search logic 44 may perform a new search of the document database 38a using the index 38b based on the adjusted concepts and weightings received from the user computing device 12a. In some examples, the new search may also be based in part on the initial search query. As explained above, in some examples the search logic 44 performs the search using Elasticsearch. Elasticsearch is able perform a search based on weighted search concepts, in which the search focuses more heavily on documents related to concepts that are more heavily weighted. In other examples, other search methods or frameworks may be used to perform the search based on the weighted search concepts. After performing the new search, the search logic 44 obtains a second result set of documents from the document database 38a.

After performing the new search, at step 410, the server computing device 12b returns the second result set to the user computing device 12a. At step 412, the concept extraction logic 46 extracts one or more semantic concepts from the second result set of documents. These concepts may be extracted from metadata associated with the second result set of documents, as described above. At step 414, the server computing device 12b returns the concepts extracted from the initial query by the concept extraction logic 46, the related concepts identified by the concept mapping logic 48, and the concepts extracted from the second result set of documents by the concept extraction logic 46 to the user computing device 12a. The server computing device 12b may also return the weights of the concepts used in performing the second search. The user computing device 12a may then display the second result set along with the identified concepts and the weights used to perform the second search. If the user is not satisfied with the second result set of documents, the user may again adjust the weights of the concepts using the graphical user interface 600 and a third search may be performed using the adjusted weights for the concepts. In this manner, the user may iteratively perform any number of searches while adjusting the search parameters between each search until a satisfactory result set of documents is obtained. This may continue until the user enters a new query, at which point the method of FIG. 4 begins again at step 400.

It should be understood that embodiments described herein are directed to systems and methods for performing natural language search. A server computing device may receive a natural language search query, extract concepts to be searched from the query, create a vector representation of the extracted concepts, identify one or more known concepts that have vector representations close to the vector representations of the extracted concepts, perform a search based on the known concepts, and present the search results to a user along with the known concepts that were used to perform the search.

The search results may be presented in a graphical user interface that displays the documents found by the search and the concepts that were used to perform the search. The graphical user interface may include a slider bar adjacent to each concept that may be adjusted by a user to adjust the weight of each concept for subsequent searches. A subsequent search may then be performed based on the concepts and the weights assigned by the user. The user may continue to perform additional searches with adjusted weightings to iteratively refine the search results.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for performing a search of a corpus of documents, the method comprising:
   receiving, at a computing device, a natural language search query;
   identifying a first set of semantic concepts in the natural language search query;
   training a neural network on a corpus of text to create a multi-dimensional vector space with each word in the corpus having a vector representation; and
   using the trained neural network to create a vector representation of semantic concepts in the identified first set of semantic concepts;
   identifying a second set of semantic concepts comprising semantic concepts having a vector representation within a predetermined threshold of similarity to the vector representation of one or more of the semantic concepts in the first set of semantic concepts;
   performing a search of the corpus of documents based on the first set of semantic concepts and the second set of semantic concepts to obtain a result set of documents;
   identifying a third set of semantic concepts based on the result set of documents; and
   presenting the natural language search query, the first set of semantic concepts, the second set of semantic concepts, the third set of semantic concepts identified in semantic mapping, and the result set of documents to the user in a graphical user interface.

2. The method of claim 1, wherein identifying the first set of semantic concepts in the natural language search query comprises identifying keyword terms within the natural language search query using a natural language processing kit.

3. The method of claim 2, wherein identifying the first set of semantic concepts in the natural language search query comprises:
   determining a relevancy score for each of the identified keyword terms; and
   selecting, as a semantic concept for the first set of semantic concepts, each of the identified keyword terms that has a relevancy score above a predetermined threshold.

4. The method of claim 2, wherein identifying the first set of semantic concepts in the natural language search query comprises:
   identifying a syntactic structure of the natural language search query; and
   identifying parts of speech tags or n-grams within the natural language search query.

5. The method of claim 1, wherein identifying the first set of semantic concepts in the natural language search query comprises identifying keyword terms within the natural language search query using term frequency-inverse document frequency based n-gram generation and syntactic chunking.

6. The method of claim 5, wherein identifying the first set of semantic concepts in the natural language search query comprises:
  determining a term frequency-inverse document frequency score for each word in the natural language search query based on the corpus of documents; and
  selecting, as a semantic concept for the first set of semantic concepts, each word in the natural language search query that has a term frequency-inverse document frequency score above a predetermined threshold.

7. The method of claim 1, wherein identifying the first set of semantic concepts in the natural language search query comprises:
  identifying a first set of keyword terms within the natural language search query using a natural language processing kit;
  determining a relevancy score for each keyword term of the first set of keyword terms using the natural language processing kit;
  identifying a second set of keyword terms within the natural language search query using term frequency-inverse document frequency analysis;
  determining a relevancy score for each keyword term of the second set of keyword terms based on a term frequency-inverse document frequency score of each keyword term;
  applying a first weight to the relevancy score of each keyword term of the first set of keyword terms to obtain a weighted score for each keyword term of the first set of keyword terms;
  applying a second weight to the relevancy score of each keyword term of the second set of keyword terms to obtain a weighted score for each keyword term of the second set of keyword terms; and
  selecting, as a semantic concept for the first set of semantic concepts, each keyword term of the first set of keyword terms and each keyword term of the second set of keyword terms that has a weighted score above a predetermined threshold.

8. The method of claim 1, wherein identifying the first set of semantic concepts in the natural language search query comprises:
  identifying a set of keyword terms within the natural language search query using a natural language processing kit;
  determining a term frequency-inverse document frequency score for each keyword term of the set of keyword terms; and
  selecting, as a semantic concept for the first set of semantic concepts, each keyword term of the set of keyword terms that has a term frequency-inverse document frequency score above a predetermined threshold.

9. The method of claim 1, further comprising using Word2vec embedding to create the vector representation of the semantic concepts in the first set of semantic concepts.

10. The method of claim 1, wherein the predetermined threshold of similarity comprises a predetermined maximum cosine similarity.

11. The method of claim 1, further comprising:
  receiving input from the user after presenting the result set of documents to the user;
  performing a second search of the corpus of documents based on the first set of semantic concepts, the second set of semantic concepts, the third set of semantic concepts and the input from the user to obtain a second result set of documents;
  identifying a fourth set of semantic concepts based on the second result set of documents;
  presenting the second result set of documents to the user; and
  presenting the fourth set of semantic concepts to the user.

12. The method of claim 11, further comprising:
  identifying the fourth set of semantic concepts based on metadata associated with the second result set of documents.

13. The method of claim 11, further comprising:
  performing the second search of the corpus of documents based on weightings of at least one semantic concept of the first set of semantic concepts, the second set of semantic concepts, or the third set of semantic concepts received from the user.

14. The method of claim 11, further comprising performing the second search of the corpus of documents using Elasticsearch.

15. The method of claim 11, further comprising displaying a slider bar adjacent to at least one semantic concept of the first set of semantic concepts, the second set of semantic concepts, or the third set of semantic concepts, wherein the slider bar is operable to be adjusted to set the weightings.

16. The method of claim 11, wherein the input from the user comprises removing one or more semantic concepts of the first set of semantic concepts, the second set of semantic concepts, or the third set of semantic concepts to obtain a modified set of semantic concepts,
  the method comprising performing the second search of the corpus of documents based on the modified set of semantic concepts.

17. A system for performing a search of a corpus of documents, the system comprising:
  a processing device; and
  a non-transitory, processor-readable storage medium comprising one or more programming instructions stored thereon that, when executed, cause the processing device to:
    receive a natural language search query;
    identify a first set of semantic concepts in the natural language search query;
    train a neural network on a corpus of text to create a multi-dimensional vector space with each word in the corpus having a vector representation; and
    use the trained neural network to create a vector representation of semantic concepts of in the identified first set of semantic concepts;
    identify a second set of semantic concepts comprising semantic concepts having a vector representation within a predetermined threshold of similarity to the vector representation of one or more semantic concepts of the first semantic concepts;
    perform a search of the corpus of documents based on the first set of semantic concepts and the second set of semantic concepts to obtain a result set of documents;
    identify a third set of semantic concepts based on the result set of documents; and
    present the natural language search query, the first set of semantic concepts, the second set of semantic concepts, the third set of semantic concepts identified in semantic mapping, and the result set of documents to the user in a graphical user interface.

18. The system of claim 17, wherein the non-transitory, processor readable storage medium further comprises one or more programming instructions stored thereon that, when executed, cause the processing device to:
receive input from the user after the processing device presents the result set of documents to the user;
perform a second search of the corpus of documents based on the first set of semantic concepts, the second set of semantic concepts, and the third set of semantic concepts and the input from the user to obtain a second result set of documents;
identify a fourth set of semantic concepts based on the second result set of documents;
present the second result set of documents to the user; and
present the fourth set of semantic concepts to the user.

19. The system of claim 18, wherein the instructions cause the processing device to identify the fourth set of semantic concepts based on metadata associated with the second result set of documents.

20. A non-transitory, computer-readable storage medium that is operable by a computer to perform a search of a corpus of documents, the non-transitory, computer-readable medium comprising one or more programming instructions stored thereon for causing a processing device to:
receive a natural language search query;
identify a first set of semantic concepts in the natural language search query;
train a neural network on a corpus of text to create a multi-dimensional vector space with each word in the corpus having a vector representation; and
use the trained neural network to create a vector representation of semantic concepts in the identified first set of semantic concepts;
identify a second set of semantic concepts comprising semantic concepts having a vector representation within a predetermined threshold of similarity to the vector representation of one or more semantic concepts of the first set of semantic concepts;
perform a search of the corpus of documents based on the first set of semantic concepts and the second set of semantic concepts to obtain a result set of documents;
identify a third set of semantic concepts based on the result set of documents; and
present the natural language search query, the first set of semantic concepts, the second set of semantic concepts, the third set of semantic concepts identified in semantic mapping, and the result set of documents to the user in a graphical user interface.

* * * * *